United States Patent [19]

Yeo et al.

[11] Patent Number: 5,071,947
[45] Date of Patent: Dec. 10, 1991

[54] PREPARATION OF DENATURED BISMALEIMIDE DI SECONDARY DIAMINE RESIN

[75] Inventors: Jong K. Yeo; Chung S. Kim; Dong J. Lee, all of Daejeon, Rep. of Korea

[73] Assignee: Lucky, Ltd., Seoul, Rep. of Korea

[21] Appl. No.: 528,083

[22] Filed: May 24, 1990

Related U.S. Application Data

[63] Continuation-in-part of Ser. No. 286,152, Dec. 19, 1988, abandoned.

[51] Int. Cl.⁵ .............................................. C08G 73/12
[52] U.S. Cl. .................................... 528/314; 528/170; 528/312; 528/315; 528/318; 528/321; 528/322
[58] Field of Search ............... 528/322, 170, 321, 314, 528/315, 318, 312

[56] References Cited

U.S. PATENT DOCUMENTS 3,699,930  6/1972  Asahara et al. .................... 528/322
3,897,393  7/1975  Lu ..................................... 528/322

*Primary Examiner*—Harold D. Anderson
*Attorney, Agent, or Firm*—Birch, Stewart, Kolasch & Birch

[57] ABSTRACT

A denatured bismaleimide resin of repeating units represented by the following formula (I) and process for preparing same which comprises the Michael addition reaction of a bismaleimide and an aromatic secondary diamine:

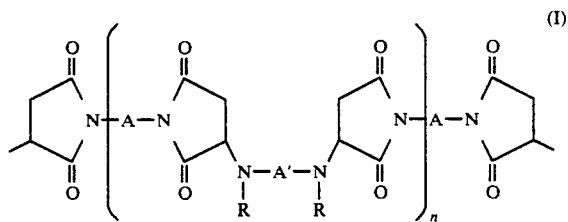

wherein, n represents an integer of 1 to 3,

A represents a divalent group having from 2 to 20 carbon atoms,

A' represents a divalent group having less than 20 carbon atoms which includes at least one or more aromatic groups, and R represents aliphatic having from 1 to 10 carbon atoms.

6 Claims, No Drawings

PREPARATION OF DENATURED BISMALEIMIDE DI SECONDARY DIAMINE RESIN

This application is a continuation-in-part of application Ser. No. 286,152, field on Dec. 19, 1988, now abandoned.

BACKGROUND OF THE INVENTION

1. Field of the Invention

The present invention relates to a novel denatured bismaleimide (hereinafter "BMI") resin shown by the following formula (I) and to a process for preparing same. More particularly, the present invention relates to the denatured bismaleimide oligomer of repeating units represented by the following formula (I) which comprises the Michael addition reaction of a bismaleimide and an aromatic secondary diamine:

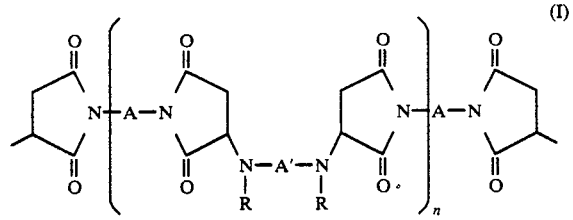

wherein, n represents an integer of 1 to 3,

A represents a divalent group having from 2 to 20 carbon atoms,

A' represents a divalent group having less than 20 carbon atoms which includes at least one or more aromatic groups, and R represents aliphatic group having from 1 to 10 carbon atoms.

The BMI resin of the present invention has excellent processability and improved toughness without a decrease in heat resistance. Especially, the prior problem, that is, the problem of the viscosity of the resin increasing suddenly as crosslinking progresses, can be solved and the pot life of the resin (namely, the maximum usable time of the resin which is not cured yet in spite of addition of a curing agent) is improved to a considerable degree. Therefore, the BMI resin of the present invention can be cast into a complicated shape. And, in case of the composite materials the hot-melt process can be carried out without having to use any solvent, as well as not having to use a polar solvent having a high boiling point. When the prepreg for production of composite materials is prepared using the BMI resin by means of a hot-melt process, there is an advantage in properties of the materials formed, because no solvent, such as a polar solvent having a high boiling point, had been used in the formation thereof.

2. Description of the Prior Art

Generally, reactive oligomers are low molecular weight materials which contain a moiety showing the property of a completely cured resin. They have been used as structural materials for improving processability of prior heat resistant resins having excellent heat stability.

Bismaleimide resins may undergo shaping in the state of oligomers. Their thermal and mechanical properties, when cured, and the shaping conditions thereof, may be greatly influenced by frame structures and molecular weights thereof.

Recently, bismaleimide resins have been widely used as matrix resins of the most recent composite materials in various fields of updated technologies, such as the aeronautical space industry and the defense industry, as well as in the heat resistance-required fields such as the electronics industry, the auto industry and so on. This is due to the fact that they have excellent heat-oxidation stability, hot-wet strength, dimension stability, flame retardance and processability. Also these materials are relatively inexpensive.

The resins produced by polymerization of only the bismaleimides alone, have generally exhibited distinct heat resistance of 300° C. or more of the second transition temperature (Tg) because of their high crosslinking densities. On the other hand, these resins have some disadvantages, namely, they are brittle and soluble in only polar solvents having a high boiling point, such as N-methyl-2-pyrrolidone (b.p. 202° C.), N,N',-dimethyl formamide (b.p. 153° C.), and the like. In the case of producing a prepreg by means of impregnating carbon fiber with a polar solvent, the produced prepreg contains a large amount of residual solvent because it is difficult to remove the polar solvent. Also, in the case of laminating the prepreg, the residual solvent acts as a plasticizer and it volatilizes at a high temperature. As a result, the properties of the prepreg are reduced to an undesirable level.

A representative bismaleimide resin which is on the market, is Kerimid 601 (manufactured by Rhone Poulenc Co. in France). It has a molecular weight of about 1,000, which is reactive oligomer terminal-treated with maleimide, and it is prepared by the Michael addition of N,N'-4,4'-diphenylmethane bismaleimide and 4,4'-diaminodiphenylmethane as a primary diamine as shown in U.S. Pat. No. 3,562,223. In the case of preparing the bismaleimide resin in accordance with the method disclosed in U.S. Pat. No. 3,562,223, the molecular weight of the oligomer increases through chain extension, and consequently the crosslinking density, when cured, is reduced. Although the heat resistance deteriorates slightly, the resin retains a toughness to some extent. At this time, when the amount of primary diamine is too excessive, the resin tends to lose its value as a heat resistant resin because it is easily degraded at a high temperature.

According to the cited U.S. patent, the preferable mole ratio of bismaleimide to primary diamine has been found to be 2.5 to 1, at which point the commercialization of the bismaleimide resin becomes possible.

However, Kerimid 601 resin, the subject matter of U.S. Pat. No. 3,562,223, is prepared using N-methyl-2-pyrrolidone as a polar solvent having a high boiling point. Therefore, the resin has only limited use, for example, as the matrix resin of a multi-layer printed circuit board in the electronics industry, because of its high crosslinking density. According to the patent, after forming oligomers of low molecular weight by the Michael addition of a bismaleimide and a primary diamine at a low temperature, the oligomers are cured at a high temperature whereby, crosslinking occurs by homopolymerization of the terminal double bonds of the bismaleimide, and additional crosslinking by the diamine occurs simultaneously. As a result, the resin exhibits a very high crosslinking density.

SUMMARY OF THE INVENTION

An object of the present invention is to provide a novel denatured bismaleimide resin possessing excellent properties, such as heat resistance, toughness, flexural modulus, and the like.

Another object of the present invention is to provide a process for the preparation of the denatured bismaleimide resin of the present invention, which is characterized by carrying out the Michael addition of bismaleimides and aromatic secondary amines at a low temperature.

In order to overcome the above disadvantages, we discovered during our careful research for the present invention, that a new denatured bismaleimide resin prepared by the Michael addition of a bismaleimide and an aromatic secondary diamines at a low temperature has improved properties, such as heat resistance, mechanical strength, and modulus of elasticity.

More particularly, when the Michael addition is carried out using bismaleimides and aromatic secondary diamines at a low temperature, the previous problem, that is the sudden increase in viscosity of the resins due to the progression of crosslinking during the addition, as mentioned above, can be solved and the pot life of the resins can be improved to a considerable degree. Also, because no primary diamines are used, but secondary diamines are used, having all-isolated polar amine moieties, the water absorption property of the resins becomes greatly increased, and also various properties of the resins, such as heat resistance, mechanical strength, and modulus of elasticity are improved markedly.

The term "pot life" means the maximum usable time of the resin composition which is not yet cured in spite of addition of the curing agent. When the pot life is long, there are some advantages, that is, the resin composition can be cast into a complicated shape. Moreover, in case of the composite materials, the hot-melt process can be carried. out without using an electrolyzing solvent as well as not having to use a polar solvent having a high boiling point.

DETAILED DESCRIPTION OF THE INVENTION

The present invention relates to a denatured bismaleimide resin of repeating units represented by the following formula (I):

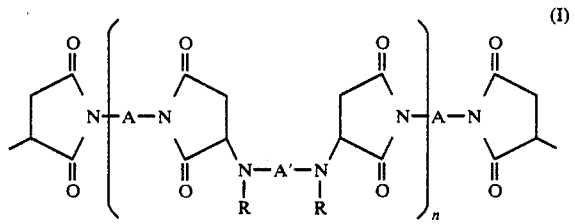

wherein, n represents an integer of 1 to 3,

A represents a divalent group having from 2 to 20 carbon atoms,

A' represents a divalent group having less than 20 carbon atoms which includes at least one or more aromatic groups, and R represents aliphatic group having from 1 to 10 carbon atoms.

The denatured bismaleimide resin of repeating units represented by the formula (I) may be prepared as the Michael addition of a bismaleimide and an aromatic secondary diamine at a low temperature of 100° to 150° C.

The bismaleimide, which is used as starting compound in the present invention, may be shown by the following formula (II)

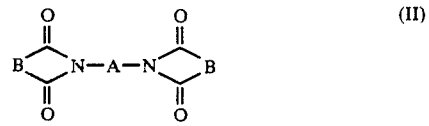

wherein, B represents a divalent group having from 2 to 6 carbon atoms, which contains a carbon-carbon double bond, and A presents a divalent group having from 2 to 20 carbon atoms.

Such bismaleimides of the formula (II) include, for example, N,N'-1,-3-phenylene bismaleimide, N,N'-4,4'-diphenylmethane bismaleimide, N,N'-4,4'-diphenylether bismaleimide, N,N'-4,4'-diphenylsulfone bismaleimide, N,N'-3,4'-diphenylsulfone bismaleimide, N,N'-4,4'-dicyclohexylmethane bismaleimide, N,N'-4,4'-dimethylcyclohexane bismaleimide, N,N'-1,3-xylidine bismaleimide, 2,4-bismaleimide toluene, and so on.

The aromatic secondary diamine which is used as a reactant in the present invention, may be shown by the following formula (III)

wherein, A' represents a divalent group having less than 20 carbon atoms which includes at least one or more aromatic groups, and R represents aliphatic group having from 1 to 10 carbon atoms.

Such aromatic secondary diamines of the formula (III) include, for example, N,N'-dimethyl-4,4'-diaminodiphenylmethane, N,N'-methylethyl-4,4'-diaminodiphenylmethane, N,N'-dimethyl-4,4'-diaminodiphenylsulfone, N,N'-dimethyl-4,4'-diaminodiphenylether, N-(1,3-dimethylbutyl)-N'-phenyl-para phenylene diamine, N-isopropyl-N'-phenyl-para phenylene diamine, N,N'-diphenyl-para phenylene diamine, N,N'-dimethyl-2,4-diamino toluene, N,N'-dimethyl-2,6-diaminotoluene, N,N'-dicyclohexyl-4,4'-diamino diphenylmethane, and so on.

According to the present invention, the bismaleimide (II) and the aromatic secondary diamine (III) are preferably used in amounts of 1.2:1 to 10:1, more preferably 1.5:1 to 3:1 of the mole ratio (bismaleimide:secondary diamine). When the amount of secondary diamine exceeds said amount range, sufficient heat resistance cannot be obtained because the crosslinking density becomes to decrease undesirably. On the other hand, when the amount of secondary diamine is less than said amount range, toughness of the resin is reduced, even though heat resistance thereof can be improved.

In the present invention, the curing accelerator, which decreases the curing temperature of the resin and then accelerates the cure thereof, may be used to shorten the process time. As suitable curing accelerator, an ionic catalyst or a free radical catalyst may be used in an amount of 0.1 to 10% by weight, preferably 0.1 to 5.0% by weight, to the total weight of the reaction mixture.

Representative ionic catalysts include especially tertiary amines, for example, diazabicyclooctane, and imidazole derivatives such as imidazole, 2-methyl imidazole, 2-phenyl imidazole, 4-methyl-2-phenyl imidazole, benzimidazole, and the like. When such ionic catalysts are used, there is an advantage that the fracture toughness of the matrix resin can be improved.

Representative free radical catalysts include, for example, azobisisobutyronitrile (AIBN) and hydroperoxides as well as organic peroxides such as dicumyl peroxide (DCP), t-butyl-cumyl peroxide, 2,5-di(butylperoxy) hexane, t-butylperoxy benzoate and the like, and the amount thereof is preferred to be 0.1 to 5.0% by weight to the total weight of the reaction mixture.

Also, in the present invention, said ionic catalyst and said free radical catalyst can be used separately or in mixture, as the curing accelerator. In the case of using a mixed catalyst, the suitable mixed ratio ranges from 2:1 to 1:2 by weight of the ionic catalyst to the free radical catalyst.

According to the present invention, the bismaleimide oligomer resin possessing excellent properties such as heat resistance, toughness, modulus of elasticity and so on, can be provided. Especially, when the prepreg for production of composite materials is prepared using this bismaleimide resin by means of a hot-melt process, there are some advantages in the properties of the materials formed, as well as in the process and in the economy as mentioned above, because of not having to use a solvent, such as a polar solvent having a high boiling point.

DESCRIPTION OF THE PREFERRED EMBODIMENTS

The present invention will be further described in detail with the following examples. It should be noted that the present invention is not limited to these examples. And, the obtained bismaleimide resins in accordance with the examples and the comparative examples are tested according to the following ASTM standards:

| | |
|---|---|
| Flexural Modulus | ASTM D 790 - 71 |
| Fracture Toughness | ASTM E 399 - 79 |
| Water Absorption | ASTM D 570 - 71 |
| Dielectric Strength | ASTM D 150 - 69 T |

EXAMPLE 1

1 mole of N,N'-dimethyl-4,4'-diamino diphenyl methane and 2.5 moles of N,N'-4,4-diphenyl methane bismaleimide were added into a three opening flask equipped with a thermometer and an agitator. After the reaction mixture was reacted for about 10 minutes at 130° C. with continuously agitating and changed into a clear solution, it was poured into an aluminum dish and cooled to normal temperature (25° C). The resultant solid resin was pulverized in a pestle bowl to obtain lustrous yellowish brown powder.

Then, the RMS (Pheometric Mechanical Spectrometer) model 605 was used to observe the viscosity, namely, the obtained powder was put in a parallel plate and trimmed, and after, it was isothermal cured at 130° C. At this time, the viscosities thereof were measured with the passage of the time as the dynamic mode and the pot life thereof was analyzed.

The results are shown in Table 1.

Comparative Example 1

Resin powder for comparison was prepared and tested in the same manner as described in Example 1, except that 9.5 g (1 mole) of 4,4'-diaminodiphenylmethane maintained a temperature of 120° C., and after, 42.9 g (2.5 moles) of N,N'-diphenylmethane bismaleimide was added therein and reacted for about 5 minutes.

The results are shown in Table 1.

Comparative Example 2

Resin powder for comparison was prepared and tested in the same manner as described in Example 1 except that 4.5 g (0.5 moles) and N,N'-dimethyl-4,4'-diaminodiphenylmethane and 3.9 g (0.5 moles) of 4,4'-diaminodiphenylmethane were mixed and maintained in a temperature of 130° C., and then, 35.8 g (2.5 moles) of N,N'-4,4'-diphenylmethane bismaleimide was added therein and reacted for about 10 minutes.

The results are shown in Table 1.

TABLE 1

| Time (min.) | Temperature (°C.) | Viscosity (Poise) | | |
|---|---|---|---|---|
| | | Example 1 | Comparative Example 1 | Comparative Example 2 |
| 0.1 | 90 | $6.5 \times 10^1$ | $5.21 \times 10^3$ | $2.26 \times 10^2$ |
| 5.1 | 119 | $1.4 \times 10^1$ | $1.12 \times 10^2$ | $3.25 \times 10^1$ |
| 10.1 | 130 | $3.0 \times 10^0$ | $3.84 \times 10^1$ | $1.46 \times 10^1$ |
| 15.1 | 130 | $2.8 \times 10^0$ | $7.96 \times 10^1$ | $2.07 \times 10^1$ |
| 20.1 | 131 | $4.2 \times 10^0$ | $2.09 \times 10^2$ | $3.36 \times 10^1$ |
| 25.1 | 130 | $5.1 \times 10^0$ | $6.56 \times 10^2$ | $4.94 \times 10^1$ |
| 30.1 | 131 | $6.7 \times 10^0$ | $2.22 \times 10^3$ | $8.42 \times 10^1$ |
| 35.1 | 130 | $1.1 \times 10^1$ | $6.27 \times 10^3$ | $1.73 \times 10^2$ |
| 40.1 | 130 | $1.5 \times 10^1$ | $1.53 \times 10^4$ | $3.25 \times 10^2$ |
| 45.1 | 131 | $2.1 \times 10^1$ | $2.79 \times 10^4$ | $6.12 \times 10^2$ |
| 50.1 | 131 | $3.0 \times 10^1$ | $3.71 \times 10^4$ | $9.44 \times 10^2$ |

According to the foregoing results shown in Table 1 the bismaleimide rein of the Example 1 in accordance with the present invention has lower viscosity than that of the Comparative Example 1 and 2.

As generally known, the lower the viscosity of the resin is, the better the processability is.

EXAMPLE 2

22.6 g of 4,4'-methylene bis (N-methyl aniline) (MBMA) was added into a three-opening flask equipped with a thermometer and an agitator and the mixture was preheated to 140° C. in an oil bath. And, 107.4 g of 4,4'-bismaleimide diphenylmethane (BMDM) was added therein and reacted for about 10 minutes with continuously agitating at 140° C. When the reaction mixture was changed into a clear solution, it was further reacted for about 30 minutes to be degassed. The resultant mixture was casted in an aluminum mold (125 mm × 130 mm × 65 mm) which was preheated to a temperature of 120° C., and it was then heated to 200° C. within 30 minutes. After maintaining the temperature for about 4 hours, the mold was removed. Subsequently, it was kept for 15 hours at 220° C. to undergo the post-cure and slowly cooled down to 25° C. Then, test specimens were prepared, and tests were carried out in accordance with ASTM standards.

For example, in order to examine flexural modulus of the resulting resin, test specimens measuring 50 mm in span were prepared and tests for flexural modulus were carried out at 25° C. and at 250° C. (after heating for 1050 hours) according to ASTM D 790-71.

The results are shown in Table 3.

EXAMPLE 3 AND 4

Test specimens were prepared in the same manner as described in Example 2, except that the mole ratios of BMDM and MBMA were changed as listed in Table 2. Tests were carried out according to ASTM standards.

The results are shown in Table 3.

EXAMPLES 5 TO 8

Test specimens were prepared in the same manner as described in Example 2, except that the catalysts listed in Table 2 were used. Catalysts were added into the reaction mixture after completely degassing, and the additions were followed by further degassing. Tests were carried out according to ASTM standards.

The results are shown in Table 3.

EXAMPLES 9 TO 12

Test specimens were prepared in the same manner as described in Example 2, except that the mole ratios of BMDM and MBMA were changed and the catalysts listed in Table 2 were used. Catalysts were added into the reaction mixture after completely degassing, and the additions were followed by further degassing. Tests were carried out according to ASTM standards.

The results are shown in Table 3.

EXAMPLES 13 AND 14

Test specimens were prepared in the same manner as described in Example 2, except that N,N'-meta-phenylene bismaleimide (BMI-1) and N,N'-4,4'-diphenylether bismaleimide (BMI-2) respectively were used in place of BMDM. Tests were carried out according to ASTM standards.

The results are shown in Table 3.

EXAMPLES 15 TO 17

Test specimens were prepared in the same manner as described in Example 2, except that N,N'-methylethyl diaminodiphenylmethane (2nd A-1), N-(1,3-diethylbutyl)-N'-phenyl-para phenylene diamine (2nd A-2), and N,N'-dimethyl-2,4-diamino toluene (2nd A-3), respectively, were used in place of MBMA as a secondary diamine. Tests were carried out according to ASTM standards.

The results are shown in Table 3.

TABLE 2

| EX | Bismaleimide (A) | Secondary Diamine (B) | Mole Ratio (A:B) | Catalyst, | amount (wt %) | Initial Viscosity (C.P.) |
| --- | --- | --- | --- | --- | --- | --- |
| 2 | BMDM | MBMA | 3:1 | — | — | 962 |
| 3 | BMDM | MBMA | 2.5:1 | — | — | 945 |
| 4 | BMDM | MBMA | 2:1 | — | — | 587 |
| 5 | BMDM | MBMA | 3:1 | DCP | 1.0 | — |
| 6 | BMDM | MBMA | 3:1 | 2-methyl-imidazole | 1.0 | 1,942 |
| 7 | BMDM | MBMA | 3:1 | DABCO | 1.0 | — |
| 8 | BMDM | MBMA | 3:1 | DCP/imidazole | 1.0 (0.4:0.6) | 3,540 |
| 9 | BMDM | MBMA | 2.5:1 | t-butylcumyl peroxide | 1.2 | — |
| 10 | BMDM | MBMA | 2.5:1 | 2-phenyl-imidazole | 1.2 | — |
| 11 | BMDM | MBMA | 2.5:1 | DCP | 0.5 | — |
| 12 | BMDM | MBMA | 2:1 | imidazole | 1.0 | — |
| 13 | BMI-1 | MBMA | 3:1 | — | — | — |
| 14 | BMI-2 | MBMA | 3:1 | — | — | — |
| 15 | BMDM | 2nd A-1 | 3:1 | — | — | — |
| 16 | BMDM | 2nd A-2 | 3:1 | — | — | — |
| 17 | BMDM | 2nd A-3 | 3:1 | — | — | — |

TABLE 3

| EX | Tg (°C.) by TMA | Flexural Modulus (Kg/mm²) | | Fracture Toughness $K_{IC}$(KPa:m) | Water Absorption (%) | |
| --- | --- | --- | --- | --- | --- | --- |
| | | at 25° C. | at 250° C. | | at 23° C. | at 100° C. |
| 2 | 290 | 15.3 | 12.1 | 424 | 1.06 | 0.64 |
| 3 | 285 | 13.2 | 11.8 | — | 1.16 | 0.87 |
| 4 | 275 | 12.7 | 10.6 | — | 1.56 | 0.99 |
| 5 | 280 | 14.7 | 11.9 | 378 | 0.99 | 0.56 |
| 6 | 288 | 15.2 | 12.2 | — | 0.94 | 0.64 |
| 7 | 282 | 14.5 | 11.7 | 487 | 1.16 | 0.66 |
| 8 | 292 | 14.7 | 11.5 | — | 1.05 | 0.58 |
| 9 | 280 | 13.6 | 10.8 | — | 1.29 | 0.78 |
| 10 | 276 | 13.8 | 11.1 | — | 1.47 | 0.88 |
| 11 | 265 | 12.2 | 9.7 | — | 1.77 | 1.22 |
| 12 | 276 | 12.9 | 0.1 | — | 2.05 | 1.62 |
| 13 | 284 | 14.4 | 11.7 | 404 | 1.12 | 0.68 |
| 14 | 286 | 15.1 | 12.1 | — | 0.84 | 0.33 |
| 15 | 276 | 13.4 | 11.1 | — | 1.41 | 0.71 |
| 16 | 282 | 13.9 | 8.9 | — | 1.21 | 0.61 |
| 17 | 286 | 14.7 | 10.2 | — | 1.45 | 0.82 |

EXAMPLE 18

45.2 g of N,N'-dimethyl 4,4'-diamino diphenylmethane was preheated to 130° C., 179 g of N,N'-diphenylmethane bismaleimide was added therein and agitated with an agitator until the reaction mixture became clear, and then the obtained clear mixture was degassed for 30 minutes.

3,600 Cm² of glass-fiber fabric was impregnated with the said resultant solution according to the hot-melt process. At this time, the used glass-fiber fabric was weaved into a satin type and previously pretreated with γ-aminopropyl triethoxy silane (commercial name "A1100", manufactured by Union Carbide Co.), which was E-type glass-fiber fabric.

After impregnating, the impregnated fabric was previously reacted for 10 minutes in an air-oven with a temperature of 180° C. in order to adjust fluidity thereof for compression shaping or autoclave shaping. The obtained product was cut off into 16 pieces of test specimens measured into 150 mm × 150 mm, and these test specimens were piled up into a laminated assembly.

The laminated assembly was inserted into two pieces of highly lustrous copper foil and compressed for 1 hour as a pressure of 30 kg/Cm². The temperature was slowly increased to 220° C., and the mold was removed. After slowly heating to a temperature of 250° C., the laminated assembly was post-cured for about 24 hours and cooled down to the normal temperature. Test for the flexural modulus was carried out according to ASTM D 790-71.

The results are as follows:
Resin content: 21%
. Flexural modulus (span 50 mm):
  1) Initial flexural modulus ; 65.5 kg/mm²
  2) Flexural modulus after heating for 1050 hours at 250° C.; 58 kg/mm²

EXAMPLE 19

The degassed reaction mixture was prepared in the same practice conditions and procedure as described in Example 2. The reaction mixture was poured in the aluminum mold to form a layer of 10 mm in thickness, and it was reacted for about 10 minutes at 200° C.

After cooling down to normal temperature, the mold was removed. The obtained product was ground into powder having 80 mm in average diameter. 30 g of the resultant powder was put in a cylindric mold having a diameter of 75 mm, and the mold was inserted into a press which was preheated to 200° C. The press was pressed until a pressure of 50 kg/Cm² and kept for about 1 hour. After the mold was removed while the temperature thereof was maintained yet highly, the product was post-cured for about 24 hours at 220° C. and cooled down.

As the results that flexural modulus tests were carried out ing to ASTM D 790-71, the flexural modulus was 15.2 kg/mm² at 25° C. and 13.1 kg/mm, after heating for 860 hours, respectively. Also, the electrical properties are as shown in Table 4.

TABLE 4

| Properties | Initial Data | Data after heating for 240 hours at 250° C. |
|---|---|---|
| Dielectric constant | 3.9 | 3.5 |
| Dielectric loss Tangent (Tan δ) | 4.2 × 10⁻³ | 1.7 × 10⁻³ |
| Specific resistance | 2.2 × 10¹³ | 2.1 × 10¹⁴ |

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:
1. A process for preparing denatured bismaleimide resin which consists essentially of reacting a bismaleimide of the formula

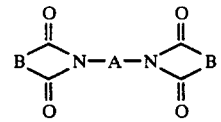

(II) with an aromatic secondary diamine of the formula

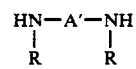

(III) in the presence of dicumyl peroxide and imidazole as a mixed catalyst at a temperature of about 100° to 150° C., said denatured bismaleimide resin of repeating units represented by the formula

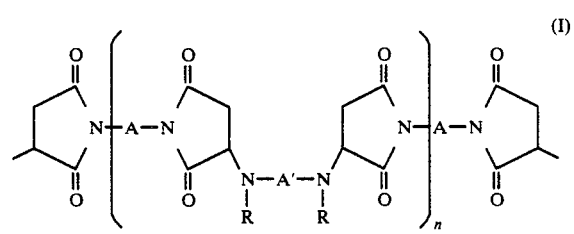

wherein, n represents an integer of 1 to 3,
  B represents a divalent group having 2 to 6 carbon atoms, which contains a carbon-carbon double bond,
  A represents a divalent group having from 2 to 20 carbon atoms,
  A' represents a divalent group having less than 20 carbon atoms which includes at least one or more aromatic groups, and
  R represents aliphatic having from 1 to 10 carbon atoms.

2. The process according to claim 1, wherein said bismaleimide is selected from at least one member of the group consisting of N,N'-1,3-phenylene bismaleimide, N,N'-4,4'-diphenylmethanebismaleimide, N,N'-4,4'-diphenyletherbismaleimide, N,N'-4,4'-diphenylsulfone bismaleimide, N,N'-3,4,-diphenylsulfone bismaleimide, N,N'-4,4'-dicyclohexylmethane bismaleimide, N,N'-4,4'-dimethylenecyclohexane bismaleimide, N,N'-4,4'-diphenylcyclohexane, bismaleimide, N,N'-1,3-xylidine bismaleimide, 2,4-bismaleimide toluene, and 2,6-bismaleimide toluene.

3. The process according to claim 1, wherein said aromatic secondary diamine is selected from the group consisting of N,N'-dimethyl-4,4'-diamino diphenyl methane, N,N'-methylethyl-4,4'-diamino diphenyl methane, N,N'-dimethyl-4,4'-diamino diphenylsulfone, N,N'-dimethyl-4,4,-diamino diphenylether, N-(1,3-dimethylbutyl)-N,-phenyl-para phenylene diamine, N-isopropyl-N'-phenyl-para phenylene diamine, N,N'-diphenyl-para phenylene diamine, N,N'-dimethyl-2,4-diamino toluene, N,N'-dimethyl-2,6-diamino toluene, and N,N'-dicyclohexyl-4,4'-diamino diphenylmethane.

4. The process according to claim 1, wherein said bismaleimide and the aromatic secondary diamine are reacted in an amount of from 1.2:1 to 10:1 by mole ratio.

5. The process according to claim 1, wherein said catalyst is mixed in a ratio of 2:1 to 1:2 by weight of imidazole to dicumyl peroxide.

6. The process according to claim 1, wherein said bismaleimide and the aromatic secondary diamine are reacted in an amount of from 1.5:1 to 3:1 by mole ratio.

* * * * *